United States Patent Office 3,388,783
Patented June 18, 1968

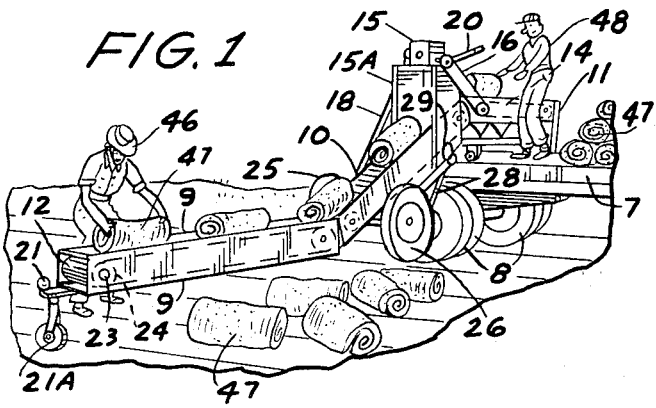

3,388,783
TRUCK LOADING CONVEYOR
Robert C. Daymon, 7450 Weller Road,
Gregory, Mich. 48137
Filed Nov. 21, 1966, Ser. No. 595,987
5 Claims. (Cl. 198—11)

ABSTRACT OF THE DISCLOSURE

This application discloses a portable truck loading conveyor which is mounted on a pair of wheels whereby the conveyor may be moved longitudinally, or laterally, with respect to a truck. One section of the conveyor is also provided with support wheels to enable the device to be moved from end to end of the truck bed, means to attach the conveyor to the truck and means to adjust the height of the conveyor relative to the truck.

---

This invention relates to conveyors and has particular reference to a conveyor for loading trucks, trailers and the like.

An object of the invention is to provide a portable conveyor whereby a truck or trailer may be rapidly and economically loaded in the field.

Another object of the invention is to provide a vehicle loading conveyor which is constructed and arranged with a pair of pivotable wheels whereby the conveyor may be transported from one location to another.

Another object of the invention is to provide a device of the character indicated which is constructed with a pair of pivotable wheels which enables the conveyor to be moved into loading position on a truck or trailer.

Another object of the invention is the provision of a vehicle loading conveyor which is constructed with means for moving the conveyor from one end to the other, of the vehicle being loaded.

Another object of the invention is the provision of a device of the character indicated which is constructed with means for attaching the conveyor to a vehicle to be loaded.

Another object of the invention is the provision of a device of the character indicated which is constructed and arranged with means to absorb the side thrust on a vehicle being loaded as the same is being loaded by the conveyor.

Another object of the invention is the provision of a loading conveyor which is constructed with means for raising and lowering the conveyor with reference to the bed of the vehicle.

Another object of the invention is the provision of a device of the character indicated which is constructed and arranged with a plurality of endless belts and common means for driving the belts.

Another object of the invention is the provision of a conveyor for loading a vehicle which is constructed with a plurality of endless belts, common means to drive said belts, and control means accessible from the bed of the vehicle.

Another object of the invention is the provision of a device of the character indicated which may be readily employed in loading sod rolls or other harvested products directly from the harvesting field to a vehicle.

The foregoing and other objects and advantages of the invention will become more apparent as the description proceeds, reference being made from time to time to the accompanying drawing, forming part of the within disclosure, in which drawing:

FIG. 1 is a perspective view of a conveyor embodying the invention, shown in loading position on a tractor or trailer vehicle.

FIG. 2 is a perspective view of the device shown in FIG. 1 from another angle.

FIG. 3 is an enlarged rear perspective view of the discharge end of the conveyor shown in FIGS. 1 and 2.

FIG. 4 is a fragmentary detail showing the bed side rail, contacting rollers and adjusting means.

FIG. 5 is a fragmentary detail showing the ground wheels and means for elevating the loading end of the conveyor.

FIG. 6 is a left end view of the device shown in FIG. 5.

Referring now more particularly to the drawings, it will be understood that in the embodiment herein disclosed the reference characters 7 and 8 (FIGS. 1 and 3) indicate the bed and supporting wheels of a motor vehicle, such as a tractor or trailer which is being loaded by means of the conveyor embodying the invention, and form no part of the invention except as combined with the elements hereinafter described.

The invention resides in the provision of a conveyor which in the embodiment herein disclosed is made up of three rigidly connected channel like sections 9, 10, and 11 (FIGS. 2 and 3), each section of which is provided with an endless belt 12, 13, and 14, all of which are driven by means of a gasoline engine 15, which is supported on an inverted U-shaped member 15A, which is welded, or otherwise secured to the side members of the conveyor section 10. The endless belts 12, 13 and 14 are preferably driven through chains and sprockets 16, power transfer unit 17, drive shaft 18, and power transfer unit 19, which in turn drive the rollers which support the endless belts 12, 13, and 14.

The power train is controlled by means of a lever 20 which is within easy access of an operator standing on the vehicle bed 7.

The section 9 of the conveyor is preferably provided with a coupling 21 by which another section (not shown) may be attached to the conveyor if desired. The free end of the section 9 is supported by means of a castor assembly 21A. The additional section (not shown) may be driven by means of a sprocket 22 (FIG. 2), which is mounted on the shaft 23, which also supports the roller 24, which in turn supports the end of the endless belt 12 (FIG. 1).

In order to provide means for transporting the conveyor assembly from place to place and to assist in bringing it into loading position with respect to the truck or trailer, I provide a pair of wheels 25 and 26, which are mounted on a suitable axle 27 (FIG. 5), which is secured by welding to the plate 27A of a turntable comprising plates 27A and 27B. A handle 27C is secured to the plate 27A, and is provided for manually swinging the axle 27 on the turntable. When the axle 27 and the wheels 25 and 26 are in the position shown in FIGS. 1, 2 and 5, the conveyor may be moved laterally to and away from the truck. When the axle 27 and the wheels 25 and 26 are lowered and rotated on the turntable 90 degrees from the position shown in FIGS. 1, 2 and 5, the conveyor may be moved parallel with the truck. With this combination and arrangement the conveyor may be moved laterally to and away from the truck, or may be moved parallel with the truck. The second plate 27B of the turntable (FIGS. 5 and 6) is mounted by welding at the end of a frame 28, the latter being pivoted as at 29 to the side frame members of the section 10. The wheel and frame assembly 25–28 is angularly adjusted with reference to the sections 9 and 10 by means of a double acting hydraulic cylinder 27D and a push-pull rod 27E, which is attached to the piston (not shown) of the double acting cylinder 27D. The cylinder 27D is connected to a conventional hydraulic power source through the line 27F. The hydraulic power source (not shown) is also driven by the engine 15 by any suitable means.

The discharge section 11 of the conveyor (FIG. 3) is supported by a rectangular framework 30 (FIG. 3), through struts 31 and 32, which elements 30, 31, and 32, also support the conveyor section 10, as at 33 (FIG. 3). The members 30, 31 and 32 are provided with rollers 34 and castors 35 (FIG. 3) which serve to movably support the whole assembly upon the bed of the vehicle 7, so that the conveyor assembly may be moved from front to rear, or vice versa of the vehicle 7 during the loading operations.

Side thrust of the assembly (FIG. 3) is absorbed by a pair of rollers 36, which rollers are arranged to contact a side rail 37 carried on the vehicle body. The rollers 36 are mounted on spindles which are supported by a frame 38, which is laterally adjustable by means of a jack screw 44, which is manually rotated by means of the wheel 45. The jack screw 44 (FIGS. 3 and 4) threadedly engages the frame 38 and a cross member 38A which is welded, or otherwise suitably secured to the triangular extension 41.

A second pair of rollers 42 is mounted for rotation on a frame 43, the latter being vertically adjustable by means of the jack screw 39, which threadedly engages a suitable member (not shown) attached to the frame 30 and a member 43A comprising part of the frame 43, whereby upon rotation of the jack screw 39 by the wheel 40, the frame 43 and the rollers 42 may be vertically adjusted into and out of contacting relation with the underside of the truck body and the rail 37. This prevents the section 11 of the conveyor from tipping when a heavy load is imposed on the section 10.

In operation the conveyor functions as follows:

With the wheels 25 and 26 in lowered position (FIG. 5) the conveyor assembly is wheeled into position laterally of the vehicle 7. The wheels 25 and 26 are then elevated (FIGS. 1 and 2) so that the weight of the conveyor assembly rests upon the rollers 34 and 35, which come to rest upon the top surface of the vehicle bed 7. The frame 38 is then moved laterally toward the bed 7 so that the roller 36 contact the side rail 37 to absorb the side thrust. The frame 43 is then elevated by the jack screw 39 so that the rollers 42 contact the under face of the side rail 37 or the truck bed to prevent the conveyor from tipping on the vehicle bed 7 when the latter is being loaded.

When the assembly is in the position just indicated the weight of the sections 9 and 10 will be carried by the castor 21A and through the section 11 and its support. The engine 15 having previously been started, the lever 20 is then thrown into position so that the engine motivates the endless belts 12, 13, and 14, through the power train previously described.

In the embodiment shown in FIG. 1 an attendant 46 is seen loading rolls of sod 47 on to the conveyor section 9, which rolls of sod are then conveyed on the endless belts to the discharge section 11, from which they are removed by the unloader and operator 48, who piles the rolls one the vehicle bed 7, and as the rolls accumulate the operator moves the assembly over the bed of the vehicle 7 to a new position. This operation continues until the vehicle is loaded, after which the engine 15 is disconnected from the conveyor drive train. The wheels 25 and 26 are then lowered into ground contacting position. This elevates the conveyor assembly and permits the assembly to be retracted from the vehicle by means of the transportation wheels 25 and 26.

Having described my invention, what I claim and desire to secure by Letters Patent is:

1. A loading conveyor for use with a truck having a bed, comprising the combination of a plurality of integrated sections, means to support and transport said conveyor, an endless belt rotatable on each section, independent power generating means carried by one of said sections to drive said belts, and means on said last section for controlling said drive means, one of said sections having means thereon for securing the assembly to the bed of a truck, means to support and transport said section on the said truck bed and means to raise and lower the conveyor with respect to said truck bed.

2. The structure of claim 1, in which said means to raise and lower the conveyor include a pair of wheels mounted on an axle carried by a turntable secured to a frame which is pivoted to one of said sections, said pivoted frame being adjustable by hydraulic means.

3. A loading conveyor for use with a truck having a bed comprising the combination of a plurality of integrated sections, means to support and transport said conveyor, an endless belt rotatable on each section, independent power generating means carried by one of said sections to drive said belts, and means on said last section for controlling said drive means, one of said sections being provided with rollers for transporting said section over the bed of the truck and means for absorbing vertical and lateral thrust generated on said section.

4. A loading conveyor for use with a truck having a bed comprising the combination of a plurality of integrated sections, means to support and transport said conveyor, an endless belt rotatable on each section, independent power generating means carried by one of said sections to drive said belts, and means on said last section for controlling said drive means, the said conveyor consisting of at least three sections, the intermediate section having a depending frame pivoted thereto, an axle rotatable on a turntable secured to said frame, wheels rotatable on said axle, and power means connecting said frame to said intermediate section for elevating and lowering said wheels with respect to said section and for elevating and lowering the conveyor assembly with respect to said truck.

5. A loading conveyor for use with a truck having a bed comprising the combination of a plurality of integrated sections, means to support and transport said conveyor, an endless belt rotatable on each section, independent power generating means carried by one of said sections to drive said belts, and means on said last section for controlling said drive means, one of the end sections being constructed with movable means for supporting the conveyor assembly on the bed of the truck, and means for absorbing vertical and end thrust on said section.

References Cited

UNITED STATES PATENTS

| | | | |
|---|---|---|---|
| 741,108 | 10/1903 | Camp | 198—233 |
| 2,592,219 | 4/1952 | West | 280—476 |
| 2,708,504 | 5/1955 | Puzey | 198—233 |
| 2,303,684 | 12/1942 | Cook | 198—233 |
| 2,778,477 | 1/1957 | Lundahl | 198—233 |
| 3,067,858 | 12/1962 | Loosli | 198—233 |

RICHARD E. AEGERTER, *Primary Examiner.*